United States Patent [19]

Kraushaar

[11] Patent Number: 4,900,763
[45] Date of Patent: Feb. 13, 1990

[54] ULTRAVIOLET RADIATION CURABLE VEHICLES

[75] Inventor: Douglas J. Kraushaar, Washington, Pa.

[73] Assignee: Ciba-Geigy Corporation, Ardsley, N.Y.

[21] Appl. No.: 160,740

[22] Filed: Feb. 26, 1988

[51] Int. Cl.$^4$ .................. C08F 2/50; C08F 226/02; C08F 299/04; C08F 299/06
[52] U.S. Cl. ........................................ 522/14; 522/16; 522/93; 522/96; 522/81; 522/95; 427/54.1; 427/227
[58] Field of Search ........................................... 522/14

[56] References Cited

U.S. PATENT DOCUMENTS

| | | | |
|---|---|---|---|
| 4,057,431 | 11/1977 | Finelli | 522/97 |
| 4,286,008 | 8/1981 | Reed | 522/81 |
| 4,306,012 | 12/1981 | Scheve | 522/81 |
| 4,390,565 | 6/1983 | Fonda | 522/81 |
| 4,649,062 | 3/1987 | Kosiorek | 522/14 |
| 4,652,604 | 3/1987 | Walls | 522/95 |
| 4,684,388 | 8/1987 | Boaz | 522/81 |
| 4,690,987 | 9/1987 | Sakakibara | 525/920 |

Primary Examiner—Lewis T. Jacobs
Assistant Examiner—Arthur H. Koeckert
Attorney, Agent, or Firm—Harry Falber

[57] ABSTRACT

Vehicles for ultraviolet radiation-curable ceramic enamels comprising (a) acrylate- or methacrylate- modified oligomers; (b) monofunctional acrylate- or methacrylate-modified monomers; (c) pentafunctional acrylate or methacrylate-modified monomers; and (d) a photoinitiator system for said polymerizable components; and the enamels prepared therefrom comprising glass enamels and the vehicles as described.

8 Claims, No Drawings

ULTRAVIOLET RADIATION CURABLE VEHICLES

This invention relates to ultraviolet radiation curable organic vehicles which are incorporated into compositions to provide thick film ceramic colors, which then can be cured almost instantly by ultraviolet radiation. Cured coatings of such compositions on heat resistant substrates, such as glass, metals and ceramics, can be fired at a later date cleanly removing the organic portion and leaving a glassy pigmented ceramic enamel adhered firmly to the substrate.

Conventional coatings involving ceramic glass enamels or glazes use vehicles which are frequently oily in nature and require drying prior to application of a second color coat. Infrared heat is often used, but this is slow, costly, and energy consumption is very high. Conventional coatings also contain large percentages of solvents, which must be evaporated during the drying operation, but this is environmentally undesirable and leads to on-site safety hazards.

A more recent development is disclosed in Scheve, U.S. Pat. No. 4,306,012 in which a vehicle consisting of a solvent-free combination of conventional acrylate- or methacrylate-terminated prepolymers and acrylate- or methacrylate-monomers is stabilized by addition of free-radical polymerization inhibitors and mixed with a ceramic frit, then cured on a heat-resistant substrate by electron beam radiation or, after adding photoinitiators, by ultraviolet radiation. If, in practice, however, such compositions are applied by screen printing techniques, the films tend to be too thin or to develop pin holes on firing. There are also observed difficulties, especially when using ultraviolet radiation, in curing the vehicle all the way through, if thick, highly pigmented films are laid down. Finally, without careful attention to selection of the components, difficulties are encountered in overprinting, that is printing one layer and curing it, then printing another over it and curing it, and, finally, firing to produce a composite.

Other photocurable compositions have also been disclosed. U.S. 4,072,592 describes a radiation curable coating based on an adduct of acrylic acid and an epoxy resin and a reaction acrylate monomer vehicle. These systems are not directed for use with glass frit components. Similar coatings are disclosed in U.S. 4,070,262 and U.S. 4,071,425, while coatings requiring N-vinyl imido-containing components are disclosed in U.S. 4,319,811.

Additional radiation curable ceramic ink compositions are disclosed in U.S. 4,390,565 and U.S. 4.649,062. The former requires the presence of at least one acrylated polycaprolactone diol polyurethane, while the latter requires a multi-component combination of acrylate- or methacrylate- modified oligomers, acrylate or methacrylate monomers, a mixture of photoinitiators and a polymerization inhibitor. Although latter system has, for example, provided certain improved performance characteristics, additional improvements in terms of rheology, humidity resistance, overprinting capability and flexibility of use are still desired.

It has now been discovered that an improved ceramic vehicle can be provided, which is amendable for use in screen printable compositions with glass enamels. The vehicle employs a balance in terms of crosslink density of an acrylate- or methacrylate-terminated oligomer component, a balance in terms of mono- and penta-functionality of acrylate- or methacrylate-terminated monomer components and a balanced combination in terms of depth of cure of photoinitiators. Also provided are printable compositions comprising the new vehicles and a conventional amount of a glass enamel, i.e. ceramic frit plus pigment. In addition, methods are provided to print heat-resistant substrates with compositions containing the new vehicle. With the present invention, very high cure speeds are possible, up to 100 ft./min., with some colors, and this permits reduced energy costs, improved handling, and stacking. Highly pigmented coatings of increased wet film thickness can be used, because of the excellent depth of cure provided herein. In contrast with conventional vehicles, controlled burnout of the vehicles of this invention more readily provides pinhole-free coatings after firing. In addition, the present compositions can be used with different colors, such as blacks and whites, without modification of the photoinitiator or base vheicle, and they also had themselves to multiple-color applications.

In particular, the ultraviolet curable vehicle systems of this invention outperform existing systems by:

(a) performing at increased coating thicknesses where other vehicles will neither cure nor fire out;

(b) performing in multi-printing applications, particularly by facilitating the virtual immediate printing of a second layer over the cured underlayer without time delay and/or concern about coating adhesion;

(c) performing in over-printing applications wherein, for example, an electrically conductive layer is applied over a printing medium containing the vehicle;

(d) exhibiting reduced rheological sensitivity to humidity in the environment;

(e) being applicable for use with a wide variety of ceramic frit and pigment components;

(f) being compatible with various anti-stick additives encountered in enamels applied to glass to be subjected to forming operations; and (g) performing in new glass enamel areas and with glass enamels having lower firing temperatures for use in, e.g. the appliance product lines.

According to the present invention, there are provided ultraviolet radiation curable vehicles for ceramic frits, the vehicles comprising:

(a) at least one polymerizable liquid oligomer containing a backbone including at least two acrylate or methacrylate functional end grups, the at least two functional groups being at least sufficient to provide effective cure and solvent resistance to the cured vehicle;

(b) at least one photopolymerizable liquid monomer exhibiting mono-acrylate or methacrylate functionality;

(c) at least one photopolymerizable liquid monomer exhibiting penta-acrylate or methacrylate functionality; and (d) a photoinitiator system for said polymerizable components.

In accordance with an especially preferred embodiment of this invention, there are provided ultraviolet radiation curable vehicles for ceramic frits, the vehicles comprising:

(a) at least two polymerizable liquid oligomers containing acrylate or methacrylate functional end groups and selected from difunctional- or trifunctional-polyester acrylates or methacrylates and difunctional or trifunctional polyurethane acrylates or methacrylates or a mixture of any of the foregoing;

(b) at least one monofunctional polyether acrylate or methacrylate;

(c) at least one pentafunctional aliphatic pentaacrylate or pentamethacrylate; and (d) a photoinitiator combination comprising
  (i) a substituted thioxanthone compound;
  (ii) an amine compound; and
  (iii) an acetophenone derivative.

Of particular preference are two (a) components, a polyester acrylate and a polyurethane acrylate, one (b) and one (c) component, and a photoinitiator combination of a substituted thioxanthone, an ester of an aminobenzoic acid and a 2-phenyl acetophenone compound.

Also provided by the present invention are ultraviolet radiaiton curable compositions for coating the surface of the heat-resistant substrates. Such compositions comprise (1) for each part by weight of a vehicle as defined above;

(2) from about 2 parts to about 5.5 parts by weight of a glass enamel.

The present invention also includes a process for coating a heat-resistant substrate selected from glass, metal and ceramic comprising (1) applying a printing medium to the heat-resistant substrate, wherein the printing medium comprises a glass enamel and vehicle therefor, as defined above;

(2) curing the medium with ultraviolet radiation after it is applied to the substrate; and (3) thereafter firing the substrate with the applied and cured printing medium at a temperature sufficient to burn off the vehicle and fuse the frit to the substrate.

With respect to oligomer component (a), all of the required features can be provided with the selection of a single entity, if a judicious choice is made. Preferably, however, a combination of oligomers will facilitate balancing of properties, such as adhesion, clean burnout on firing, etc. The di- or trifunctional polyester acrylate or methacrylate will generally have a number average molecular weight in the range of about 15,000 to 80,000 and, as noted, functionality in the range of two to three and an aliphatic or aromatic backbone structure. A typical acrylate terminated copolymer containing polyester linkages is ZL-1178 from Morton Thiokol, Inc.

The urethane acrylates generally exhibit aromatic or aliphatic backbones, with functionality ranging from 2 to 6, preferably about 3, a molecular weight in the range of 100 to over 2500, preferably from 1000 to 2500, a viscosity in the range of 20 poise to above 200 poise, preferably above 200 poise. Suitable commercially available materials are EBECRYL 264, produced by Virginia Chemicals Inc., and UVITHANE 782 from Morton Thiokol, Inc.

The monofunctional polyether acrylate or methacrylate can be selected from among allyl acrylate, allyl methacrylate, tetrahydrofuryl acrylate or methacrylate, cyclohexyl methacrylate, n-hexyl methacrylate, 2-(2-ethoxy-ehtoxy) ethyl acrylate, n-lauryl acrylate or methacrylate, 2-phenoxyethyl acrylate, glycidyl methacrylate, glycidyl acrylate, acrylated methylolmelamine, and the like. Preferred for component (b) is 2-phenoxyethyl acrylate available as SARTOMER 339 from Sartomer Co.

the pentafunctional aliphatic pentaacrylate or pentamethacrlate includes pentaerythritol pentaacrylates or methacrylates such as dipentaerythritol monohydroxypentaacrylate (SARTOMER 399 from the Sartomer Co.) or the corresponding methacrylate.

It is further to be noted that di- and tri-functional acrylate or methacrylate monomers may be optionally included in the vehicles for purposes of viscosity and printability adjustment.

The combination of photoinitiators will comprise an acetophenone derivative, e.g., 2,2,-diethoxyacetophenone, 2,2-dimethoxy-2-phenylacetophenone, halogenated alkyl aryl ketones, α-hydroxy-α-cyclohexyl phenyl ketone, benzoin alkyl ethers, and the like. Preferred is 2,2-dimethoxy-2-phenylacetophenone, commerically available from CIBA-GEIGY Corp. as IRGACURE 651. Helpful for deep curing are substituted thioxanthone compounds, among which can be mentioned 2-chlorothioxanthone, 2-isopropylthioxanthone (QUANTACURE ITX), 2-methylthioxanthone, 2-decylthioxanthone and 2-dodecylthioxanthone (DTX). These can be made in known ways and also are available from commercial sources. Preferred is isopropylthioxanthone from Aceto Chemicals Co., (QUANTACURE ITX.) Important for a proper balance of surface and through curing properties is an amine compound and more preferalby an ester of an aminobenzoic acid, or a tertiary amine, and, illustratively, an alkyl ester such as ethyl (2-dimethylamin) benzoate and ethyl(4-dimethylamino) benzoate (Aceto Chemicals Co. QUANTACURE EOB and EPD), respectively, the latter being preferred and dimethylethanolamine. See Osborne, U.S. Pat. No. 3,759,807. Also suitable is the Michel addition product of one mole of a secondary amine, such as dimethylamine and a mole of a multifunctional acrylate. See, e.g., U.S. Pat. Nos. 3,844,916, 3,925,349, and 3,914,165.

In a preferred feature, a flow promoting agent will be included. This will generally comprise a polymeric material which acts to improve screenability in a screen printing process. It will be compatible with the other components in the vehicle, and will burn off with them in a clean manner. Preferred are polymerized olefin hydrocarbons especially polybutene hydrocarbons. A suitable commercial product is a viscous polybutene polymer available from Amoco Chemicals, as INDOPOL L-14. Among the promoters previously used but not preferred are silicone polymers.

Regarding relative concentrations of the respective components, broad and preferred weight % ranges are noted below:

| Component | Broad (%) | Preferred (%) |
| --- | --- | --- |
| a (polyester) | 1-25 | 10-20 |
| a (polyurethane) | 1-25 | 3-20 |
| b | 10-50 | 35-48 |
| c | 1-35 | 8-22 |
| d (i) | 0.5-5.0 | 3.0-4.0 |
| d (ii) | 0.5-5.0 | 2.0-3.0 |
| d (iii) | 0.5-15 | 5.0-8.0 |
| flow promoter | 0-5.0 | 0.5-2.0 |

With respect to formulating the surface coating compositions of this invention, conventional components are generally used with the new vehicles described above, The compositions are made by intimately admixing the vehicle with from about 2 to about 5.5 parts and more usually 2.5 to 4.0 parts by weight of a unpigmented ceramic frit or more generally a glass enamel of ceramic frit and pigment for each part by weight of the vehicle. Ceramic frits are known commercial products consisting of high temperature stable inorganic compounds in specially designed glasses. In general, the frits are irregular shaped particles having diameters of about 2 to about 40 microns. Illustrative of the inorganic compounds are ferric oxide, titanium dioxide, chrom8ium oxide, zinc oxide, magnesium dioxide, alumina, cobalt oxide, and cadmiun oxide.

In accordance with conventional techniques, see for example, U.S. Pat. No. 4,649,062, above-mentioned, the coating compositions are applied to glass, metal or ceramic substrates, preferably by forcing the composition onto workpiece through a screen. The composition will form a film which will not run at room temperature. The vehicle is then subjected to ultraviolet radiation and the vehicle cures or hardens. Suitable for this purpose is a radiation intensity of about 0.1–100 watts per squre centimeter. After such exposure, the coating will have been cured to such an extent that the integrity of the resulting film is substantially maintainable. For example, a twisted thumbpint cannot be impressed into it. This feature permits stacking and/or storing of the resulting substrate. After curing, the substrate coated with the cured composition is fired in the region of 535°–760° C., depending on the nature of the substrate. Ideally, the vehicle is initially entirely burned off around 510°–595° C. Then at the corresponding temperature for the proper frit, the frit and pigment are fused to the surface of the substrate and become a permanent part thereof. Clean burnoff is accomplished by the vehicles of this invention because they are not so tightly crosslinked that they are still present when the frit is melting, permitting ash to be trapped under the surface and giving the coating an undesirable irregular surface.

It should also be noted that U.S. 4,684,388 discloses the use of anti-stack additives in UV-curable vehicles to provide glass enamel formulations for application to glass which is subsequently subjected to various forming and molding operations. It has been observed, however, that certain UV-curable vehicles tend to polymerize prematurely in this application and thus are not available for use therein. The instant vehicles do not suffer from such a liability. Rather, they are compatible with a broad range of anti-stack additives and thus are fully utile in the applications described in the above noted patent.

The following examples will further illustrate the embodiments of this invention. In these examples, all parts given are by weight unless otherwise noted.

EXAMPLE 1

A vehicle is prepared by blending the ingredients in the listed order with the photoinitiators being added under low heat and low shear.

| | parts |
|---|---|
| (1) liquid acrylate terminated copolymer with polyester linkages in backbone | 14.93 |
| (2) polyester urethane acrylate | 4.98 |
| (3) 2-phenoxyethyl acrylate | 45.76 |
| (4) dipentaerythritol monohydroxy-pentaacrylate | 20.24 |
| (5) 2-isopropylthioxanthone | 4.03 |
| (6) ethyl(4-dimethylamino)benzoate | 2.50 |
| (7) 2,2-dimethoxy-2-phenylacetophenone | 7.06 |

| -continued | parts |
|---|---|
| (8) polybutene polymer | 0.50 |

(1) ZL-1178
(2) UVITHANE 782
(3) SARTOMER 339
(4) SARTOMER 399
(5) QUANTICURE ITX
(6) QUANTICURE EPD
(7) IRGACURE 651
(8) INDOPOL L-14

The resulting vehicle exhibits good flow characteristcs with a viscosity of 242 cps as determined on a Brookfield viscometer at 24° C. with a #27 spindle at 100 rpm.

EXAMPLE 2

The following formulations are prepared according to the procedure of Example 1.

| | parts | | |
|---|---|---|---|
| Component | 2 | 3 | 4 |
| (1) | 15.00 | 15.00 | 14.85 |
| (2) | 5.00 | 5.00 | 4.95 |
| (3) | 45.99 | 45.99 | 45.53 |
| (4) | 20.34 | 20.34 | 20.14 |
| (5) | 4.05 | 4.05 | 4.00 |
| (6) | 2.52 | 2.52 | 2.50 |
| (7) | 7.10 | — | 7.03 |
| (8) | — | — | 1.00 |
| (9) acetophenone derivative | — | 7.10 | — |

(9) IRGACURE 907 from Ciba-Geigy Corp.

EXAMPLE 3

A black standard automotive windshield color firt and pigment powder is mixed in a bakery type mixer with each of the vehicles prepared above at a 4:1 frit:-vehicle weight ratio, and the mixture is milled on a laboratory three roll mill, one time, to obtain a storage stable composition for printing on a heat resistant substrate according to this invention. The material is applied through a 200 mesh print screen in a 3"×3" square about 1.5 mils thick onto a glass plate, and the coated plate is passed under a single mercury lamp operating at 300 watts/inch in a Fusion Systems ultraviolet radiation machine at rates of 20, 40 and 60 feet/minute, such that a cured coating, resistant to tearing under pressure of a twisted thum is obtained. The coated plate is next place in an oven and subjected to a temperature of 705° C. for 3 minutes, the organic vehicle burns off completely and the coating has a msooth glossy surface with the ceramic frit fused tightly to the substrate. As noted, the various systems are observed for flow, degree of cure (thumb test), signs of blistering and pin holes, and signs of release.

In addition, the systems are tested for overprinting capability utilizing two printing media, one a conventional screen printable conductive composition comprising a low melting glass frit, e.g., a lead borosilicate, and a conductive amount of a metal powder, e.g., silver powder or silver flake, dispersed in a pine oil based resinous vhielce, and the other a black pigmented medium as described in the initial procedure of this example. The black medium is screen printed on glass first and cured with one mercury lamp at rates of 20, 40 and 60 feet/minute and the black medium is creen printed over the first. The subsurface and the overprinted coatings are fired at 705° C. for 3 minutes and observed for degree of adhesion and formation of undesirable gray coloration.

The results are noted below.

|  | Vehicle # | | | | |
| --- | --- | --- | --- | --- | --- |
|  | 1 | 1* | 2 | 3 | 4 |
| flow property | exc. | exc. | exc. | exc. | exc. |
| cure at 20 ft/min. | exc. | exc. | exc. | exc. | exc. |
| cure at 40 ft/min. | exc. | exc. | exc. | exc. | exc. |
| cure at 60 ft/min. | exc. | exc. | exc. | exc. | exc. |
| evidence of pinholes | none | none | none | slight | none |
| vehicle burn out | total | total | total | total | total |
| release | none | none | none | none | none |
| overprint effectiveness | exc. | exc. | exc. | good | exc. |
| gray coloration | none | slight | slight | moderate | none |

*thicker film applied with 160 mesh screen
exc. = excellent performance

EXAMPLE 4

The Example 3 system utilizing vehicle #3 (unfired) is maintained under ambient conditions of light and temperature and observed for evidence of release (bubble formation). Virtually no release is observed after 15 days. The 15 day sample is then fired at 705° C. for 3 minutes and evaluated. System stability is evidenced by the absence of differences in appearance between the 15 day sample and the original sample.

EXAMPLE 5

Sample stability is further determined by initially measuring the Brookfield viscosity at 24° C. utilizing a #7 spindle at 20 rpm of the Example 3 system utilizing vehicle #3, placing the sample in a bath maintained at 24° C. and periodically measuring the viscosity of the sample. It is noted that the 2000 cps initial viscosity does not vary during the 33 day test period.

Correspondingly, stability under accelerated aging is also determined for the Example 3 system utilizing vehicle #1 by placing the sample in a oven @38° C. and periodically examining the sample for evidence of solid formation indicative of polymerization. No signs of polymerization are in evidence after 40 days.

EXAMPLE 6

The procedures of Examples 1 and 3 are repated to prepare the following systems:

| Component | parts | | | | | | |
| --- | --- | --- | --- | --- | --- | --- | --- |
|  | 5 | 6 | 7 | 8 | 9 | 10 | 11 |
| (1) | 15.94 | 14.93 | 21.00 | 14.93 | 11.94 | 20.00 | 15.00 |
| (2) | 4.98 | 4.98 | 5.00 | 4.98 | 3.98 | 20.00 | 17.00 |
| (3) | 46.77 | 46.77 | 41.99 | 45.16 | 56.51 | 45.26 | 45.26 |
| (4) | 18.26 | 19.23 | 20.34 | 10.17 | 16.19 | 2.00 | 10.00 |
| (5) | 4.03 | 4.03 | 3.34 | 4.03 | 3.22 | 3.63 | 3.63 |
| (6) | 2.51 | 2.51 | 1.66 | 2.51 | 2.01 | 2.26 | 2.26 |
| (7) | 7.06 | 7.06 | 6.67 | 7.06 | 5.65 | 6.35 | 6.35 |
| (8) | 0.50 | 0.50 | — | 0.50 | 0.50 | 0.50 | 0.50 |
| (10) | — | — | — | 10.17 | — | — | — |
| (10)—trifunctional acrylate monomer (SARTOMER 368 fromSartomer Co.) | | | | | | | |
| flow | exc. | exc. | exc. | exc. | exc. | exc. | exc. |
| cure at 20 ft/min. | exc. | exc. | exc. | exc | exc. | exc. | — |
| cure at 40 ft/min. | exc. | exc. | exc. | exc. | exc. | broke | exc. |
| cure at 60 ft/min. | exc. | exc. | exc. | exc. | exc. | — | — |
| evidence of pin holes | none | none | none | none | none | none | none |
| vehicle burn out | total | total | total | total | total | total | total |
| overprint effectiveness | good | good | good | good | good | good | good |
| gray coloration | yes | moderate | slight | moderate | moderate | none | slight |

In addition, the system with vehicle #11 is exposed to >90% humidity during the preparative period. Thus, the vehicle and glass enamel are permitted to equilibrate at the high humidity conditions and the paste is then prepared and printed under similar conditions. The resulting system and the previous unexposed system exhibit similar characteristics thereby illustrating the absence of sensitivity to high humidity.

Summarizing, this invention provides improved ultraviolet radiation curable vehicles and glass enamels prepared therefrom. Variations may be made in procedures, proportions and materials without departing from the scope of the invention as defined by the following claims.

What is claimed is:

1. An ultraviolet radiation curable vehicle consisting essentially of (a) 1-25%, by weight, of a blend of a difunctional or trifunctional polyester acrylate or methacrylate and 1-25%, by weight, of a difunctional or trifunctional polyurethane acrylate or methcacrylate; (b) 10-50%, by weight, of at least one monofunctional polyether acrylate or methacrylate; (C) 1-35% by weight, of at least one pentafunctional aliphatic pentaacrylate or pentamethacrylate; and (d) a blend of 0-.5-5.0%, by weight, of a substituted thioxanthone compound, 0.5-5.0%, by weight, of an ester of an aminobenzoic acid and 0.5-15.0%, by weight, of a 2-phenyl acetophenone derivative.

2. The ultraviolet radiation curable vehicle of claim 1, wherein component (a) is a blend of a difunctional or trifunctional polyester acrylate and a difunctional or trifunctional polyurethane acrylate, component (b) is 2-phenoxyethyl acrylate, component (c) is a dipentaerythritol monohydroxy-pentaacrylate, and component (d) is a blend of 2-isopropylthioxanthone, ethyl (4-dimethylamino) benzoate and 2,2-dimethoxy-2-phenylacetophenone.

3. The ultraviolet radiation curable vehicle of claim 1 which also contains up to about 5.0%, by weight, of a flow promoter.

4. The vehicle of claim 3, wherein said flow promoter is a polybutene.

5. An ultraviolet radiation curable composition comprising a vehicle according to claim 1 and a glass enamel, said enamel and vehicle being present in a weight ratio ranging from 2:1 to 5.5:1.

6. The composition of claim 5, wherein said glass enamel comprises a combination of metal oxides.

7. The composition of claim 5, wherein said weight ratio is 4:1.

8. The composition of claim 5, wherein said vehicle comprises as component (a) a blend of difuntional or trifunctional polyester acrylate and a difunctional or trifunctional polyurethane acrylate, as component (b) 2-phenoxyethyl acrylate, as component (c) a dipentaerythritol monohydroxy-pentaacrylate, and as component (d) a blend of 2-isopropylthioxanthone, ethyl (4-dimethylamino) benzoate and 2,2-dimethoxy-2-phenylacetophenone.

* * * * *